(12) United States Patent
Haga et al.

(10) Patent No.: US 9,400,496 B2
(45) Date of Patent: Jul. 26, 2016

(54) NUMERICAL CONTROLLER WITH INTER-PATH WAITING FUNCTION

(71) Applicant: FANUC Corporation, Minamitsuru-gun, Yamanashi (JP)

(72) Inventors: Makoto Haga, Minamitsuru-gun (JP); Masaaki Shindou, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 498 days.

(21) Appl. No.: 14/031,674

(22) Filed: Sep. 19, 2013

(65) Prior Publication Data

US 2014/0088755 A1    Mar. 27, 2014

(30) Foreign Application Priority Data

Sep. 21, 2012    (JP) .................................. 2012-208736

(51) Int. Cl.
*G06F 19/00* (2011.01)
*G05B 19/18* (2006.01)
*G05B 19/408* (2006.01)

(52) U.S. Cl.
CPC .............. *G05B 19/18* (2013.01); *G05B 19/408* (2013.01); *G05B 2219/35252* (2013.01); *G05B 2219/36084* (2013.01)

(58) Field of Classification Search
CPC .................. G05B 19/18; G05B 19/408; G05B 2219/35252; G05B 2219/36084
USPC .......................................................... 700/190
See application file for complete search history.

(56) References Cited

U.S. PATENT DOCUMENTS

| | | | | |
|---|---|---|---|---|
| 2005/0090934 A1* | 4/2005 | Hirayama | .............. | B23K 9/126 700/245 |
| 2005/0267626 A1 | 12/2005 | Kochiya et al. | | |
| 2006/0229760 A1* | 10/2006 | Suzuki | ................. | G05B 19/408 700/169 |
| 2006/0229761 A1* | 10/2006 | Kita | ................... | G05B 19/4068 700/181 |

FOREIGN PATENT DOCUMENTS

| | | |
|---|---|---|
| CN | 1401098 A | 3/2003 |
| CN | 101329569 A | 12/2008 |
| EP | 1600835 A2 | 11/2005 |
| JP | H05-282020 A | 10/1993 |
| JP | H09-282019 A | 10/1997 |
| JP | H10-31509 A | 2/1998 |
| JP | 2004-334914 A | 11/2004 |
| JP | 2011-039582 A | 2/2011 |

\* cited by examiner

*Primary Examiner* — Mohammad Ali
*Assistant Examiner* — Ziaul Karim
(74) *Attorney, Agent, or Firm* — Drinker Biddle & Reath LLP

(57) ABSTRACT

A pre-read/analysis process is carried out to analyze a code in a block, and whether or not the analyzed data contains an inter-path waiting code is determined. When the block contains an inter-path waiting code, the pre-read/analysis process is suspended, and whether or not a preset specified condition is met is judged. When the specified condition is met, inter-path waiting is started. When the inter-path waiting is established, code analysis data created before creation of execution data is discarded, and a pre-read/analysis process on the next block is immediately started.

8 Claims, 8 Drawing Sheets

FIG.4

| FIRST CONTROL PATH | SECOND CONTROL PATH |
|---|---|
| O0001; | O0002; |
| N01G04X10.0; | N01G04X20.0; |
| N02G01X100.0F100.0; | N02G01X100.0F100.0; |
| N03M500P12A10.0; | N03M500P12A20.0; |
| N04G01X50.0F100.0; | N04G01X50.0F100.0; |
| N05G01Z50.0F100.0; | N05G01Z50.0F100.0; |
| M30; | M30; |

FIG.5

| FIRST CONTROL PATH | SECOND CONTROL PATH |
|---|---|
| O0003; | O0004; |
| N01G04X10.0; | N01G04X20.0; |
| N02G01X100.0F100.0; | N02G01X100.0F100.0; |
| N03M500P12BX5.0; | N03M500P12BX10.0; |
| N04G01X50.0F100.0; | N04G01X50.0F100.0; |
| N05G01Z50.0F100.0; | N05G01Z50.0F100.0; |
| M30; | M30; |

FIG.6

| FIRST CONTROL PATH | SECOND CONTROL PATH |
|---|---|
| O0005; | O0006; |
| N01G04X10.0; | N01G04X20.0; |
| N02G01X100.0F100.0; | N02G01X100.0F100.0; |
| N03M500P12C100,1; | N03M500P12C110,2; |
| N04G01X50.0F100.0; | N04G01X50.0F100.0; |
| N05G01Z50.0F100.0; | N05G01Z50.0F100.0; |
| M30; | M30; |

FIG.7

| FIRST CONTROL PATH | SECOND CONTROL PATH |
|---|---|
| O0007; | O0008; |
| N01G04X10.0; | N01G04X20.0; |
| N02G01X100.0F100.0; | N02G01X100.0F100.0; |
| N03M500P12D10.0; | N03M500P12D15.0; |
| N04G01X50.0F100.0; | N04G01X50.0F100.0; |
| N05G01Z50.0F100.0; | N05G01Z50.0F100.0; |
| M30; | M30; |

FIG.8

| FIRST CONTROL PATH | SECOND CONTROL PATH |
|---|---|
| O0009; | O0010; |
| N01G04X10.0; | N01G04X20.0; |
| N02G01X100.0F100.0; | N02G01X100.0F100.0; |
| N03M500P12EX80.0; | N03M500P12EX70.0; |
| N04G01X50.0F100.0; | N04G01X50.0F100.0; |
| N05G01Z50.0F100.0; | N05G01Z50.0F100.0; |
| M30; | M30; |

FIG.9

| FIRST CONTROL PATH | SECOND CONTROL PATH |
|---|---|
| O0011; | O0012; |
| N01G04X10.0; | N01G04X20.0; |
| N02G01X100.0F100.0; | N02G01X200.0F200.0; |
| N03M500P12F100.0; | N03M500P12F200.0; |
| N04G01X50.0F100.0; | N04G01X50.0F100.0; |
| N05G01Z50.0F100.0; | N05G01Z50.0F100.0; |
| M30; | M30; |

| FIRST CONTROL PATH | SECOND CONTROL PATH |
|---|---|
| O0013; | O0014; |
| N01G04X10.0; | N01G04X20.0; |
| N02G01X100.0F100.0; | N02G01X100.0F100.0; |
| N03M500P12DI100,5; | N03M500P12DI200,6; |
| N04G01X50.0F100.0; | N04G01X50.0F100.0; |
| N05G01Z50.0F100.0; | N05G01Z50.0F100.0; |
| M30; | M30; |

NUMERICAL CONTROLLER WITH INTER-PATH WAITING FUNCTION

RELATED APPLICATION DATA

This application claims priority under 35 U.S.C. §119 and/or §365 to Japanese Application No. 2012-208736 filed Sep. 21, 2012, the entire contents is incorporated herein by reference.

BACKGROUND OF THE INVENTION

1. Field of the Invention

The present invention relates to a numerical controller that controls a machine tool, and in particular, to a numerical controller with an inter-path waiting function of allowing control paths to cooperatively suspend operations of a machining program.

2. Description of the Related Art

Each of a plurality of drive sections of a machine tool such as a plurality of turrets in an NC lathe is operated by one or more movable axes. In order to operate the movable axes for each drive section independently and in parallel by a separate machining program, a numerical controller that controls the machine tool has one or more control paths performing a machining program pre-read/analysis process and a machining program execution process, and having axis control sections. (In a schematic block diagram of a numerical controller shown in FIG. 1, the control path corresponds to a processor 51 and a first control path axis control section to an nth control path axis control section 57-1 to 57-n).

In this case, each of the plurality of control paths operates independently, but the control paths can cooperatively suspend operations so that machining programs for the respective control paths can be executed in a timely manner. This is referred to as an inter-path waiting function.

Furthermore, if the numerical controller operates a machining program recorded in a memory or external storage means, the numerical controller needs to carry out, for each block of the machining program, two roughly classified processes:

(a) a pre-read/analysis process of sequentially pre-reading and analyzing the block of the machining program to create code analysis data and create execution data from the created code analysis data, and (b) an execution process of actually moving axes and updating coordinate values based on the execution data created by the pre-read/analysis process. The pre-read/analysis process and the execution process are carried out in different tasks (that is, the pre-read/analysis process is carried out in a pre-read/analysis process task, while the execution process is carried out in an execution process task (which is separate from the pre-read/analysis process task)) and can thus operate in parallel.

Japanese Patent Application Laid-open No. H5-282020 discloses a numerical controller with an inter-path waiting function, the numerical controller starting inter-path waiting during an execution process for an inter-path waiting command, canceling a waiting state under a specified condition, and checking a condition (specified position/machine position) specified in a block succeeding the inter-path waiting command.

Japanese Patent Application Laid-open No. H10-31509 discloses a numerical controller with an inter-path waiting function, the apparatus not carrying out inter-path waiting during an execution process for an inter-path waiting command but carrying out inter-path waiting after the inter-path waiting command at a timing when an axis movement command/block is completed, wherein a specified condition is used to carry out the inter-path waiting after the inter-path waiting command at the timing when the axis movement command/block is completed.

Japanese Patent Application Laid-open No. 2004-334914 discloses a numerical controller with an inter-path waiting function, the apparatus starting inter-path waiting during an execution process for an inter-path waiting command, canceling a waiting state under a specified condition, and checking the state of axes after the execution of the inter-path waiting command for a specified condition (the rotation speed of a spindle/a motor current value for a specified axis).

The conventional inter-path waiting function provided in a numerical controller carries out an inter-path waiting process during an execution process in a block containing an inter-path waiting code. In this case, the execution process is started after an execution process up to a block preceding a target block to be executed ends. Thus, the inter-path waiting process is precluded from being started until the execution process up to the preceding block ends.

Furthermore, during the execution process, the in-execution state (for example, the remaining amount of movement or a feed speed) of a block prior to a block being executed is precluded from being checked. Thus, the conventional inter-path waiting function fails to carry out the inter-path waiting process taking into account the in-execution state of a block prior to the block being executed.

Moreover, information is exchanged between the pre-read/analysis process task and the execution process task, between detection of the inter-path waiting code during the pre-read/analysis process and the carrying out of the inter-path waiting process during the execution process and between establishment of inter-path waiting based on the inter-path waiting process during the execution process and the beginning of a pre-read/analysis process in the next block. Thus, a delay occurs which corresponds to two task activation periods.

Now, a time chart for the conventional inter-path waiting function shown in FIG. 12 will be described. It is assumed that a block is specified which contains an inter-path waiting code "M500P12". The conventional inter-path waiting function carries out the following processing during the pre-read/analysis process task.

Pre-read/Analysis Process

One block is loaded from a machining program, and a block "M500P12" containing the inter-path waiting code is loaded.

A "code analysis section" breaks down the specified block into codes to create code analysis data. That is, "M500P12" is broken down into "M", "500", "P", and "12".

Based on the code analysis data ("M", "500", "P", and "12") created by the code analysis section, a "function code determination section" determines what function each code has.

"M" and "500" are determined to function as an inter-path waiting code No. 500.

"P" and "12" are determined to allow a first control path and a second control path to carry out inter-path waiting.

An "execution data creation section" creates execution data so as to allow the function determined by the function code determination section to be executed.

Moreover, based on the execution data created by the pre-read/analysis process, the following process is carried out during an execution process task.

Execution Process

An "inter-path waiting section" checks the control path targeted for inter-path waiting (first control path or second control path) for the state thereof and waits for processing for the inter-path waiting "M500P12" in the inter-path waiting section to be carried out.

When the processing in the inter-path waiting section is carried out, inter-path waiting is determined to have been established, and the execution process in the block containing the inter-path waiting code ends.

As shown in FIG. 12, the conventional inter-path waiting function allows the processing in the inter-path waiting section to be carried out during the execution process task for the block containing the inter-path waiting code. During the execution process task, until an execution process in one block ends, an execution process in the next block is prevented from starting. As a disadvantage, the processing in the inter-path waiting section is precluded from being carried out until the execution process in the block immediately before the block containing the inter-path waiting code ends.

SUMMARY OF THE INVENTION

Thus, an object of the present invention is to provide a numerical controller with an inter-path waiting function, the apparatus allowing processing in an inter-path waiting section to be carried out during a pre-read/analysis process task to allow the processing in the inter-path waiting section to be started even if an execution process up to the preceding block has not ended.

A numerical controller with an inter-path waiting function according to an aspect of the present invention has at least two control paths each sequentially pre-reading and analyzing each block of a machining program recorded in a memory or external storage means, and includes a code analysis section analyzing a loaded block to create code analysis data, a function code determination section determining a function of the created code analysis data, an execution data creation section that creates execution data for carrying out the function determined by the function code determination section, a pre-read/analysis suspend section suspending the pre-read/analysis process when the function code determination section determines that the block contains an inter-path waiting code, a specified condition judgment section checking an execution state of a block immediately before the block containing the inter-path waiting code with the pre-read/analysis process suspended by the pre-read/analysis suspend section, to judge whether or not a specified condition is met which specifies a condition for carrying out inter-path waiting commanded in the block containing the inter-path waiting code, an inter-path waiting section allowing suspension of the machining program for a control path targeted for the inter-path waiting commanded in the block containing the inter-path waiting code when the specified condition judgment section judges that the specified condition is met, and an inter-path waiting discard and resumption section determining the inter-path waiting to have been established when the inter-path waiting is carried out by the control path targeted for the inter-path waiting, using the same inter-path waiting code, discarding code analysis data created before the pre-read/analysis process is suspended, and immediately pre-reading the machining program from a block succeeding the block containing the inter-path waiting code to start a pre-read/analysis process.

The specified condition judgment section can start inter-path waiting when a remaining amount of movement in the preceding block reaches a specified value, when a torque around any axis reaches a specified value as a result of axis movement in the preceding block, when a specific custom macro variable reaches a specified value, when an elapsed time from a beginning of the preceding block reaches a specified value, when a mechanical coordinate value of any axis reaches a specified value as a result of axis movement in the preceding block, when a feed speed reaches a specified value as a result of axis movement in the preceding block, or when a specific signal is input.

The aspect of the present invention can provide a numerical controller with an inter-path waiting function, the apparatus allowing the processing in the inter-path waiting section to be carried out during a pre-read/analysis process to allow the processing in the inter-path waiting section to be started even if the execution process up to the preceding block has not ended.

BRIEF DESCRIPTION OF THE DRAWINGS

The foregoing and other objects and features of the present invention will be apparent from description of embodiments given with reference to attached drawings in which:

FIG. 4 is a diagram illustrating a numerical controller with two control paths in which a first control path operates a machining program O0001 and a second control path operates a machining program O0002;

FIG. 5 is a diagram illustrating a numerical controller with two control paths in which a first control path operates a machining program O0003 and a second control path operates a machining program O0004;

FIG. 6 is a diagram illustrating a numerical controller with two control paths in which a first control path operates a machining program O0005 and a second control path operates a machining program O0006;

FIG. 7 is a diagram illustrating a numerical controller with two control paths in which a first control path operates a machining program O0007 and a second control path operates a machining program O0008;

FIG. 8 is a diagram illustrating a numerical controller with two control paths in which a first control path operates a machining program O0009 and a second control path operates a machining program O0010;

FIG. 9 is a diagram illustrating a numerical controller with two control paths in which a first control path operates a machining program O0011 and a second control path operates a machining program O0012;

DESCRIPTION OF THE PREFERRED EMBODIMENTS

Figure 1:
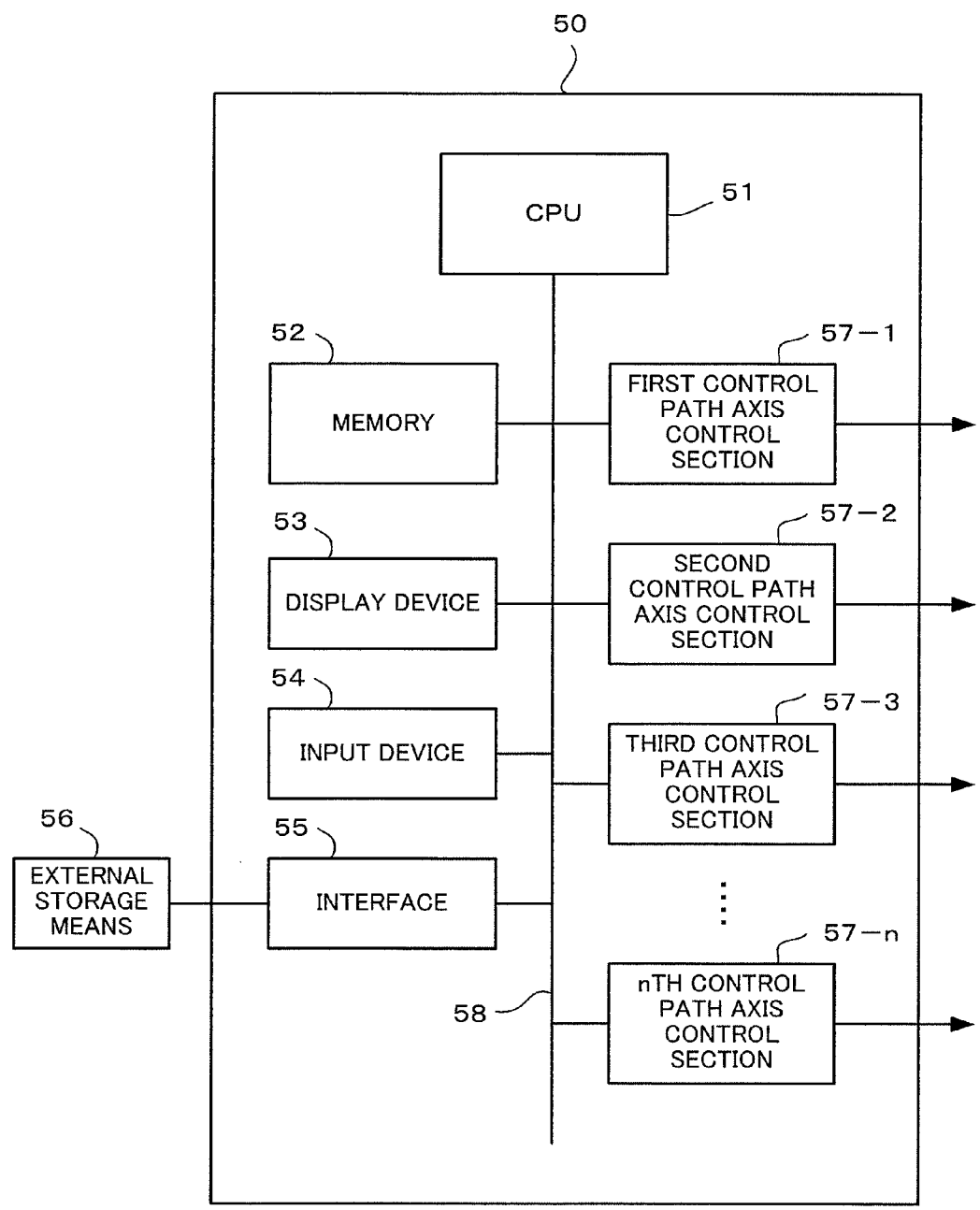
FIG. 1 is a schematic block diagram of a numerical controller with an inter-path waiting function according to embodiments of the present invention.

A numerical controller with an inter-path waiting function according to embodiments of the present invention will be described with reference to FIG. 1. A numerical controller 50 includes a processor 51, memory 52 such as a ROM, a RAM, and a nonvolatile RAM each connected to the processor 51 via a bus 58, a display device 53 including a liquid crystal display device, an input device 54 including a keyboard via which data and commands are input, an interface 55 connected to external storage means 56, and a first control path axis control section to an Nth control path axis control section 57-1 to 57-n each of which controls a corresponding motor driving a movable axis in the corresponding control path.

The memory 52 and the external storage means 56 have machining programs for the respective control paths recorded therein so that the processor 51 can read any of the machining programs to machine workpieces in accordance with read machining program.

Moreover, the memory 52 has a system program recorded therein to control the whole system, and specifically software registered therein to implement an inter-path waiting function for a plurality of control paths according to embodiments of the present invention.

Each of the first to nth control path axis control sections 57-1 to 57-n feedback-controls position and speed based on a movement command distributed by the processor 51 by executing the machining program for the corresponding control path read from the memory 52 or the external storage means 56 and a feedback signal from a position/speed detector provided in a motor, and carries out current feedback, to control the motor for the related control path. Thus, axes in the respective control paths are allowed to cooperate in moving simultaneously and synchronously or independently. The drive control operation for the plurality of control paths by the numerical controller 50 is the same as a drive control operation by the conventional numerical controller with a plurality of control paths.

Figure 2:
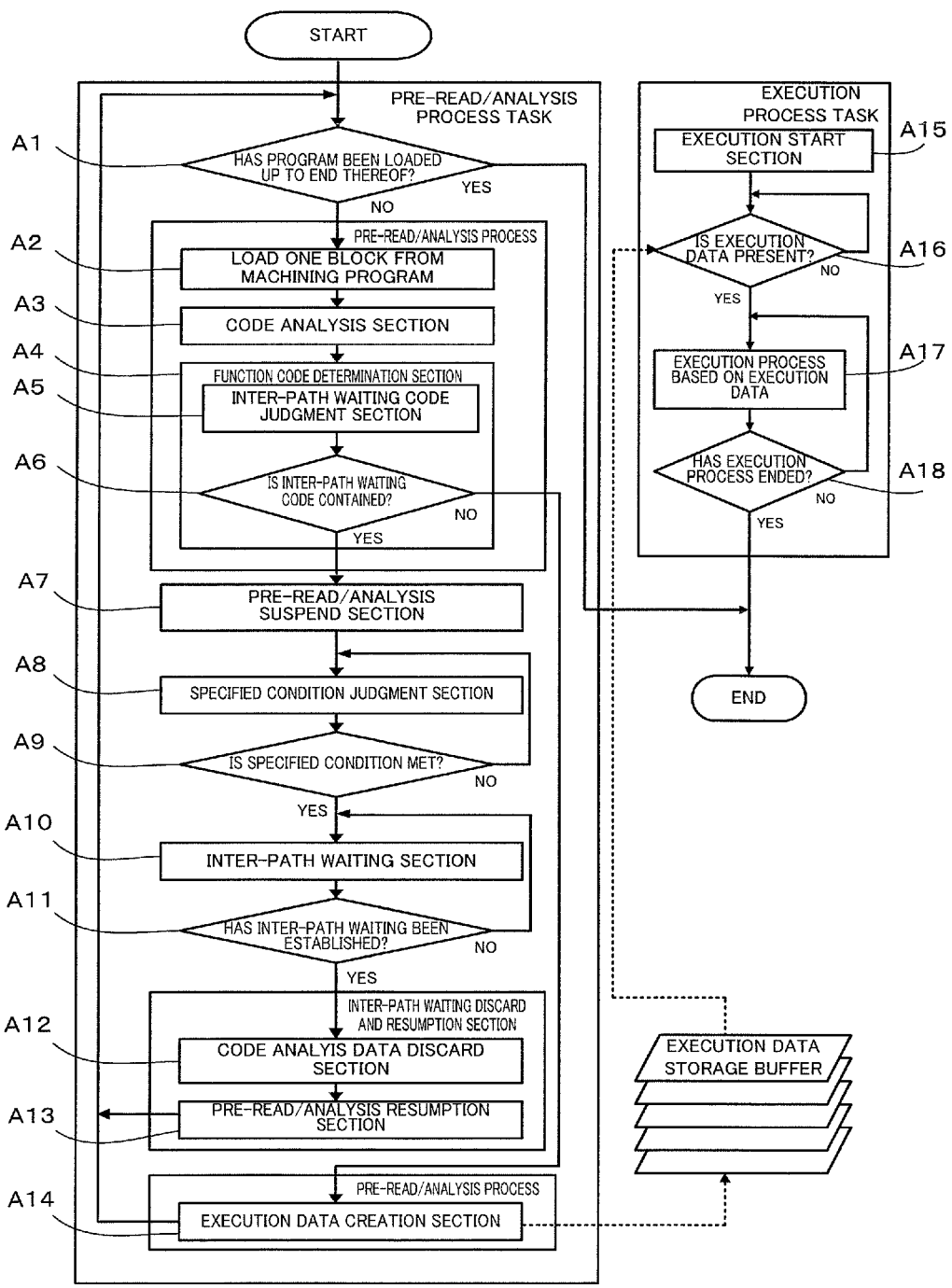
FIG. 2 is a flowchart illustrating an inter-path waiting function carried out by the numerical controller shown in FIG. 1.

The inter-path waiting function will be described with reference to a flowchart in FIG. 2 illustrating the inter-path waiting function carried out by the numerical controller shown in FIG. 1.

During a pre-read/analysis process task, first, the numerical controller with at least two control paths according to embodiments of the present invention determines whether or not the machining program has been loaded up to the end thereof (A1). If the machining program has been loaded up to the ends thereof (YES), the processing ends. If the machining program has not been loaded up to the ends thereof (NO), a pre-read/analysis process is carried out (A2 to A6 and A14).

During the pre-read/analysis process, first, each block of the machining program recorded in the memory or the external storage means is sequentially pre-read (A2). A code analysis section (A3) carries out a code analysis process on the loaded block to create code analysis data. A function code determination section (A4) carries out a determination process on the created code analysis data. The function code determination section (A4) includes an inter-path waiting code judgment section (A5) which carries out an inter-path waiting code judgment process to judge whether or not the one block loaded in A2 contains an inter-path waiting code (A6). If the block contains no inter-path waiting code (NO), processing in an execution data creation section (A14) is carried out.

On the other hand, if the one block loaded in A2 is determined to contain an inter-path waiting code (YES), a pre-read/analysis suspend section (A7) suspends the pre-read/analysis process. Then, a specified condition judgment section (A8) judges whether or not a block immediately before the block containing the inter-path waiting code meets a "specified condition" (A9). The "specified condition" as used herein refers to a judgment condition for starting inter-path waiting when one of the following items specified in the machining program reaches a value specified in the machining program: the remaining amount of movement in the block, the torque around any axis, a specific custom macro variable, the elapsed time from the beginning of a block, a mechanical coordinate value of any axis, a feed speed resulting from axis movement in the preceding block, and a specific signal.

If the processing in A9 determines that the "specified condition" is not met (NO), the processing in the specified condition judgment section (A8) is carried out again. On the other hand, if the processing in A9 determines that the "specified condition" is met (YES), processing in the inter-path waiting section (A10) is started. That is, the specified condition judgment section (A8) repeats a specified condition judgment process until the specified condition is met.

The inter-path waiting section (A10) starts an inter-path waiting process in the control path targeted for inter-path waiting commanded in the block containing the inter-path waiting code, in accordance with a command in the same inter-path waiting code, and judges whether or not the inter-path waiting has been established (A11). If the inter-path waiting has not been established (NO), the processing in the inter-path waiting section (A10) is carried out.

On the other hand, if the inter-path waiting has been established (YES), processing in an inter-path waiting discard and resumption section is carried out. That is, first, a code analysis data discard section (A12) discards code analysis data created before execution data is created (A14), and then, a pre-read/analysis resumption section (A13) immediately starts carrying out a pre-read/analysis process on the next block. Then, the processing returns to the first process (A1) of the pre-read/analysis process task.

The execution data created by the execution data creation section (A14) is stored in an execution data storage buffer, and an execution start section (A15) judges, during an execution process task, whether or not execution data is stored in the execution data storage buffer (A16). If the execution data is present in the execution data storage buffer (YES), the execution process based on execution data is carried out (A17). Then, the processing judges whether or not the execution process has ended (A18), and if the execution process has ended (YES), the execution process task is ended. On the other hand, if the execution process has not ended (NO), the execution process based on execution data (A17) is carried out again.

According to the conventional inter-path waiting function, the processing in the inter-path waiting section is precluded from carried out until the execution process in the preceding block ends. In contrast, according to embodiments of the present invention, meeting the specified condition allows the processing in the inter-path waiting section to be started even though the execution process in the preceding block has not ended, as described above. Embodiments of the present invention can thus reduce processing time compared to the conventional inter-path waiting function.

Furthermore, compared to the conventional inter-path waiting function, the inter-path waiting function according to embodiments of the present invention allows omission of creation of execution data for a pre-read/analysis process and an execution process based on execution data, enabling a further reduction in processing time. Furthermore, the in-execution state of a block prior to the block containing the inter-path waiting code can be checked. Moreover, the inter-path waiting function according to embodiments of the present invention eliminates the need to exchange information between the pre-read/analysis process task and the execution process task during the processing in the inter-path waiting section, thus enabling a reduction in processing time by an amount equal to up to two task activation periods compared to the conventional inter-path waiting function.

Figure 3:
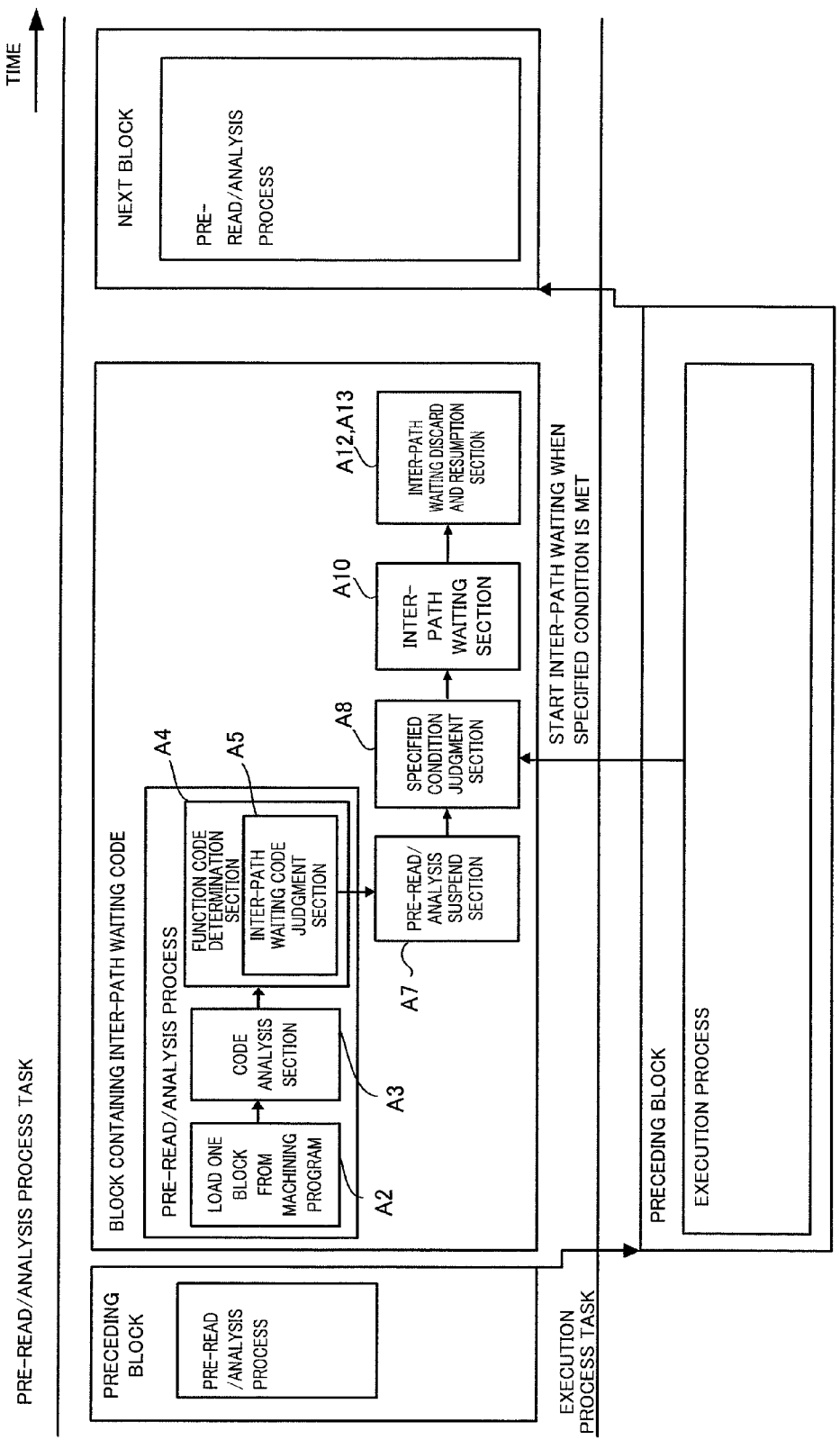
FIG. 3 is a time chart illustrating the inter-path waiting function shown in FIG. 2.

The inter-path waiting function according to embodiments of the present invention will be described with reference to a time chart in FIG. 3, wherein, in the numerical controller with the inter-path waiting function described with reference to FIG. 2, a machining program is executed, and a block containing an inter-path waiting code is specified.

For example, it is assumed that a block containing an inter-path waiting code "M500P12A10.0" is specified.

The "inter-path waiting function" according to embodiments of the present invention carries out the following process during the pre-read/analysis process task.

<Pre-read/Analysis Process Task>
Pre-read/analysis process (A2 to A6): One block is loaded from the machining program, and the block "M500P12A10.0" containing the inter-path waiting code is loaded.

The code analysis section (A3) breaks down the specified block into codes to create code analysis data. For example, when the specified block is "M500P12A 10.0", the resulting code analysis data is "M", "500", "P", "12", "A", and "10.0".

Based on the code analysis data created by the code analysis section (A3), the function code determination section (A4) determines what function each code has.

"M" and "500" are determined to function as an inter-path waiting code No. 500.

"P" and "12" are determined to allow a first control path and a second control path to carry out inter-path waiting.

"A" and "10.0" are determined to allow the inter-path waiting to be started when the remaining amount of movement becomes 10.0 or less.

The inter-path waiting code judgment section (A5) included in the function code determination section (A4) judges whether or not the loaded block "M500P12A10.0" contains an inter-path waiting code.

Pre-read/analysis suspend section (A7): suspends the pre-read/analysis process before execution data is created.

Specified condition judgment section (A8): checks whether or not the remaining amount of movement in the block immediately before the block containing the inter-path waiting code is 10.0 or less.

Inter-path waiting section (A10): checks the control path targeted for inter-path waiting (first control path or second control path) for the state thereof and waits for inter-path waiting to be carried out in accordance with the inter-path waiting code "M500P 12". When the inter-path waiting is carried out, the inter-path waiting section (A10) determines the inter-path waiting to have been established.

Inter-path waiting discard and resumption section (A12 and A13):

The inter-path waiting discard and resumption section includes the code analysis data discard section (A12) and the pre-read/analysis resumption section (A13). First, the code analysis data discard section (A12) discards code analysis data created before the pre-read/analysis process is suspended, and then, the pre-read/analysis resumption section (A13) starts the pre-read/analysis process by immediately pre-reading the machining program at a block succeeding the block containing the inter-path waiting code.

According to the "inter-path waiting function", the inter-path waiting section is implemented during the pre-read/analysis process task for the block containing the inter-path waiting code. Adding a specified condition to inter-path waiting allows the inter-path waiting section to be started when the specified condition is met during the execution process in the preceding block. Furthermore, once the inter-path waiting is established, the code analysis data created before the pre-read/analysis process is suspended is discarded, and the pre-read/analysis process in the next block is immediately started.

Embodiments will be described.

<Embodiment 1>

Embodiment 1 will be described with reference to FIG. 4. A numerical controller 50 according to Embodiment 1 (FIG. 1) has two control paths: a control path of a first control path axis control section 57-1 and a control path of a second control path axis control section 57-2. In the numerical controller 50 with the two control paths, the first control path operates a machining program O0001, and the second control path operates a machining program O0002. The first control path and the second control path carry out inter-path waiting.

In the machining program O0001 (first control path) and machining program O0002 (second control path) shown in FIG. 4, "M500" and "P12" in an N03 block correspond to an "inter-path waiting code" and a "control path targeted for inter-path waiting". "A10.0" (first control path) and "A20.0" (second control path) in the N03 block are indicative of "specified conditions" and indicate specified values for the remaining amount of movement. The condition for starting inter-path waiting is that the remaining amount of movement reaches the specified value of 10.0 in an N02 block of the first control path and that the remaining amount of movement reaches the specified value of 20.0 in an N02 block of the second control path.

In this case, the first control path and the second control path operate as follows.

[First Control Path]

(1) In an N01 block, dwelling is carried out for 10 seconds.

(2) After the execution process in the N01 block is completed, an execution process in the N02 block is started.

(3) When the execution process in the N02 block is started, a pre-read/analysis process in the N03 block is started. Here, when an M500 command is detected, the pre-read/analysis process is suspended before creation of execution data in the N03 block, and determination for the specified condition for starting inter-path waiting is started.

(4) In the N02 block of the control path, the condition for starting inter-path waiting is determined to be met when the remaining amount of movement reaches 10.0. Thus, the inter-path waiting is started. At this point, inter-path waiting in the second control path has not been started yet. Consequently, a waiting state is continued until the inter-path waiting in the second control path is started.

(5) When the inter-path waiting in the second control path is started, the inter-path waiting is determined to have been established. Code analysis data created during the pre-read/analysis process in the N03 block is discarded. A pre-read/analysis process in an N04 block is immediately started.

[Second Control Path]

(1) In an N01 block, dwelling is carried out for 20 seconds.

(2) After the execution process in the N01 block is completed, an execution process in the N02 block is started.

(3) When the execution process in the N02 block is started, a pre-read/analysis process in the N03 block is started. Here, when an M500 command is detected, the pre-read/analysis process is suspended before creation of execution data in the N03 block, and determination for the specified condition for starting inter-path waiting is started.

(4) In the N02 block of the control path, the condition for starting inter-path waiting is determined to be met when the remaining amount of movement reaches 20.0. Thus, the inter-path waiting is started.

(5) When the inter-path waiting in the second control path is started, the inter-path waiting is determined to have been established. Code analysis data created during the pre-read/analysis process in the N03 block is discarded. A pre-read/analysis process in an N04 block is immediately started.

Figure 12:
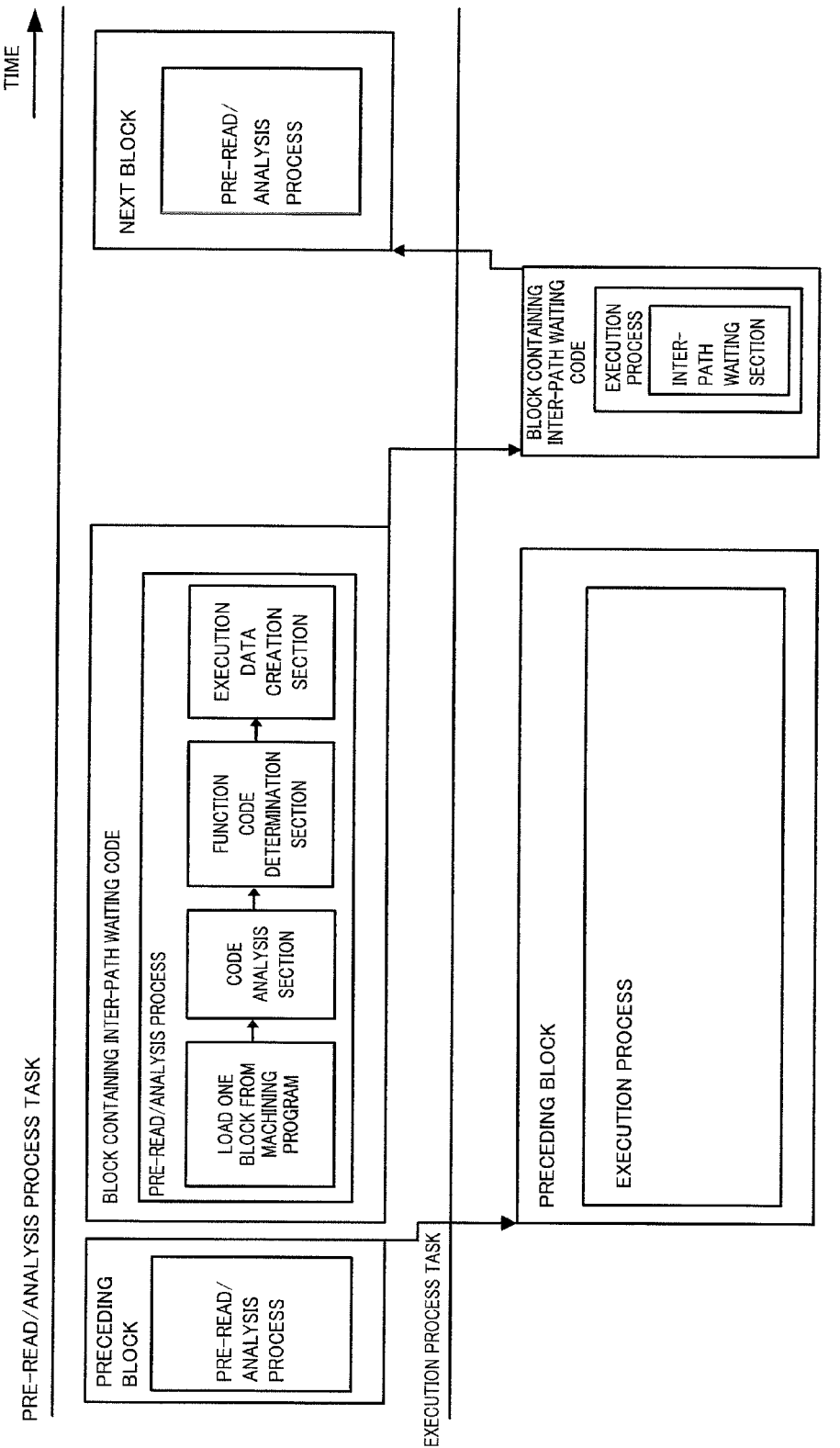
FIG. 12 is a time chart illustrating a conventional inter-path waiting function.

The conventional inter-path waiting function starts inter-path waiting upon completion of the execution process in the block immediately before the block containing the inter-path waiting code (see FIG. 12). The inter-path waiting function according to embodiments of the present invention starts inter-path waiting when the preceding block meets the "specified condition" specified in the block containing the inter-path waiting code, thus allowing the processing to be finished faster than the conventional inter-path waiting function.

Moreover, the code analysis data created during the pre-read/analysis process is discarded, and a pre-read/analysis process in the next block is immediately started (see A12 and A13 in FIG. 2). Thus, compared to the conventional inter-path waiting function, the inter-path waiting function according to embodiments of the present invention allows omission of creation of execution data during the pre-read/analysis process and an execution process based on execution data, in the block containing the inter-path waiting code. This enables a further reduction in processing time (see FIG. 3 and FIG. 12).

After inter-path waiting is established, the pre-read/analysis process may be resumed without discarding the code analysis data so that execution data can be created from the code analysis data. In this case, the created execution data prevents inter-path waiting from being carried out during an execution process, but enables the following.

Output of a signal to a programmable machine controller (PMC) as a result of the execution process, and Execution of a command other than the command for inter-path waiting given in the block containing the inter-path waiting code.

Furthermore, the "specified condition" may be preset using a parameter, a signal, or a custom macro variable instead of being specified in the block containing the inter-path waiting code.

If any specified condition is preset, the N03 of each of the machining programs for the first control path and the second control path is:

"N03 M500 P12;".

The function code determination section in the N03 block loads a set value set by the above-described specification method to determine the specified condition.

<Embodiment 2>

Embodiment 2 will be described with reference to FIG. 5. A numerical controller 50 according to Embodiment 2 (FIG. 1) has two control paths: a control path of a first control path axis control section 57-1 and a control path of a second control path axis control section 57-2. In the numerical controller 50 with the two control paths, the first control path operates a machining program O0003, and the second control path operates a machining program O0004. In an N03 block, "M500" is indicative of an inter-path waiting code, and "P12" is indicative of a "control path targeted for inter-path waiting". This indicates that the first control path and the second control path are specified to carry out inter-path waiting. Moreover, according to Embodiment 2, a judgment condition for starting inter-path waiting is that the "torque around any axis" (an item specified in the machining program) reaches a value specified in the machining program.

"BX5.0" (first control path) and "BX10.0" (second control path) in the N03 block are indicative of "specified conditions". The condition for starting inter-path waiting is that a torque around a specific axis reaches a specified value (the torque around an X axis reaches the specified value of 5.0 in an N02 block of the first control path and the torque around the X axis reaches the specified value of 10.0 in an N 02 block of the second control path).

In this case, the first control path and the second control path operate as follows.

[First Control Path]

(1) to (3) The same operation as that in the first control path according to Embodiment 1 is performed.

(4) When the torque around the X axis reaches 5.0 in an N02 block of the first control path, the processing determines that the condition for starting inter-path waiting has been met. Thus, inter-path waiting is started. At this point, inter-path waiting in the second control path has not been started yet. Consequently, a waiting state is continued until the inter-path waiting in the second control path is started.

[Second Control Path]

(1) to (3) The same operation as that in the second control path according to Embodiment 1 is performed.

(4) When the torque around the X axis reaches 10.0 in an N02 block of the second control path, the processing determines that the condition for starting inter-path waiting has been met. Thus, inter-path waiting is started.

<Embodiment 3>

Embodiment 3 will be described with reference to FIG. 6. A numerical controller 50 according to Embodiment 3 (FIG. 1) has two control paths: a control path of a first control path axis control section 57-1 and a control path of a second control path axis control section 57-2. In the numerical controller 50 with the two control paths, the first control path operates a machining program O0005, and the second control path operates a machining program O0006. In an N03 block, "M500" is indicative of an inter-path waiting code, and "P12" is indicative of a "control path targeted for inter-path waiting". This indicates that the first control path and the second control path carry out inter-path waiting. Moreover, according to Embodiment 3, a judgment condition for starting inter-path waiting is that a "specific custom macro variable" (an item specified in the machining program) reaches a value specified in the machining program.

"C100, 1" (first control path) and "C110, 2" (second control path) in the N03 block are indicative of "specified conditions". The condition for starting inter-path waiting is that specified custom macro variables reach respective specified values (a custom macro variable No. 100 reaches 1 in an N02 block of the first control path, and a custom macro variable No. 110 reaches 2 in an N02 block of the second control path).

When a coordinate value of the X axis reaches 50.0 in N02 of the first control path, another process by the PMC or the like sets 1 for the custom macro variable No. 100 in the first control path. When a coordinate value of the X axis reaches 40.0 in N02 of the second control path, another process by the PMC or the like sets 2 for the custom macro variable No. 110 in the second control path. The PMC process uses a ladder language to read and write the variables.

In this case, the first control path and the second control path operate as follows.

[First Control Path]

(1) to (3) The same operation as that in the first control path according to Embodiment 1 is performed.

(4) When the custom macro variable No. 100 reaches 1 in the N02 block of the first control path, the processing determines that the condition for starting inter-path waiting has been met. Thus, inter-path waiting is started. At this point, inter-path waiting in the second control path has not been started yet. Consequently, a waiting state is continued until the inter-path waiting in the second control path is started.

[Second Control Path]

(1) to (3) The same operation as that in the second control path according to Embodiment 1 is performed.

(4) When the custom macro variable No. 110 reaches 2 in the N02 block of the second control path, the processing determines that the condition for starting inter-path waiting has been met. Thus, inter-path waiting is started.

The custom macro variables are present at "fixed addresses" in the memory of the numerical controller, and allow the machining program stored in the numerical controller to perform a reading operation, a writing operation, and an arithmetic operation on the contents of the memory using numbers following "#" and an operator such as "=". Here, the "fixed addresses" are present in both a nonvolatile memory and a volatile memory and are managed by the numbers. For example, #1 to #33 are present in the volatile memory, and #100 to #199 are present in the nonvolatile memory. Furthermore, not only the machining program but also the process by the PMC or the like can perform reading and writing operations on the memory. When the machining program writes a numerical value to the variable, if #100=1;, 1 is written to the variable No. 100. If #110=2;, 2 is written to the variable No. 110.

<Embodiment 4>

Embodiment 4 will be described with reference to FIG. 7. A numerical controller 50 according to Embodiment 4 (FIG. 1) has two control paths: a control path of a first control path axis control section 57-1 and a control path of a second control path axis control section 57-2. In the numerical controller 50 with the two control paths, the first control path operates a machining program O0007, and the second control path operates a machining program O0008. In an N03 block, "M500" is indicative of an inter-path waiting code, and "P12" is indicative of a "control path targeted for inter-path waiting". This indicates that the first control path and the second control path carry out inter-path waiting. Moreover, according to Embodiment 4, a judgment condition for starting inter-path waiting is that the "elapsed time from the beginning of a block" (an item specified in the machining program) reaches a value specified in the machining program.

"D10.0" (first control path) and "D15.0" (second control path) in the N03 block are indicative of "specified conditions". The condition for starting inter-path waiting is that the elapsed time from the beginning of a block reaches a specified value (the elapsed time from the beginning of an N02 block of the first control path reaches 10 seconds, and the elapsed time from the beginning of an N02 block of the second control path reaches 15 seconds).

In this case, the first control path and the second control path operate as follows.

[First Control Path]

(1) to (3) The same operation as that in the first control path according to Embodiment 1 is performed.

(4) When the elapsed time from the beginning of the N02 block of the first control path reaches 10 seconds, the processing determines that the condition for starting inter-path waiting has been met. Thus, inter-path waiting is started. At this point, inter-path waiting in the second control path has not been started yet. Consequently, a waiting state is continued until the inter-path waiting in the second control path is started.

[Second Control Path]

(1) to (3) The same operation as that in the second control path according to Embodiment 1 is performed.

(4) When the elapsed time from the beginning of the N02 block of the second control path reaches 15 seconds, the processing determines that the condition for starting inter-path waiting has been met. Thus, inter-path waiting is started.

<Embodiment 5>

Embodiment 5 will be described with reference to FIG. 8. A numerical controller 50 according to Embodiment 5 (FIG. 1) has two control paths: a control path of a first control path axis control section 57-1 and a control path of a second control path axis control section 57-2. In the numerical controller 50 with the two control paths, the first control path operates a machining program O0009, and the second control path operates a machining program O0010. In an N03 block, "M500" is indicative of an inter-path waiting code, and "P12" is indicative of a "control path targeted for inter-path waiting". This indicates that the first control path and the second control path carry out inter-path waiting. Moreover, according to Embodiment 5, a judgment condition for starting inter-path waiting is that a "mechanical coordinate value of any axis" (an item specified in the machining program) reaches a value specified in the machining program.

"EX80.0" (first control path) and "EX70.0" (second control path) in the N03 block are indicative of "specified conditions". The condition for starting inter-path waiting is that a mechanical coordinate value on a specified axis reaches a specified value (the mechanical coordinate value of the X axis reaches the specified value of 80.0 in an N02 block of the first control path, and the mechanical coordinate value of the X axis reaches the specified value of 70.0 in an N02 block of the second control path).

In this case, the first control path and the second control path operate as follows.

[First Control Path]

(1) to (3) The same operation as that in the first control path according to Embodiment 1 is performed.

(4) When the mechanical coordinate of the X axis reaches 80.0 in the N02 block of the first control path, the processing determines that the condition for starting inter-path waiting has been met. Thus, inter-path waiting is started. At this point, inter-path waiting in the second control path has not been started yet. Consequently, a waiting state is continued until the inter-path waiting in the second control path is started.

[Second Control Path]

(1) to (3) The same operation as that in the second control path according to Embodiment 1 is performed.

(4) When the mechanical coordinate of the X axis reaches 70.0 in the N02 block of the second control path, the processing determines that the condition for starting inter-path waiting has been met. Thus, inter-path waiting is started.

<Embodiment 6>

Embodiment 6 will be described with reference to FIG. 9. A numerical controller 50 according to Embodiment 6 (FIG. 1) has two control paths: a control path of a first control path axis control section 57-1 and a control path of a second control path axis control section 57-2. In the numerical controller 50 with the two control paths, the first control path operates a machining program O0011, and the second control path operates a machining program O0012. In an N03 block, "M500" is indicative of an inter-path waiting code, and "P12" is indicative of a "control path targeted for inter-path waiting". This indicates that the first control path and the second control path carry out inter-path waiting. Moreover, according to Embodiment 6, a judgment condition for starting inter-path waiting is that a "feed speed resulting from axis movement in the preceding block" (an item specified in the machining program) reaches a value specified in the machining program.

"F100.0" (first control path) and "F200.0" (second control path) in the N03 block are indicative of "specified conditions". The condition for starting inter-path waiting is that the feed speed resulting from axis movement in the preceding block reaches a specified value (the feed speed for the X axis reaches the specified value of 100.0 in an N02 block of the first control path, and the feed speed for the X axis reaches the specified value of 200.0 in an N02 block of the second control path). Here, an acceleration/deceleration time constant or an acceleration is set for the control axis X and a control axis Z in the first control path and the second control path, and an amount of time (T1 and T2 in FIG. 10) is needed until the specified feed speed is reached.

In this case, the first control path and the second control path operate as follows.

[First Control Path]

(1) to (3) The same operation as that in the first control path according to Embodiment 1 is performed.

(4) When the feed speed reaches 100.0 in the N02 block of the first control path, the processing determines that the condition for starting inter-path waiting has been met. Thus, inter-path waiting is started. At this point, inter-path waiting in the second control path has not been started yet. Consequently, a waiting state is continued until the inter-path waiting in the second control path is started.

[Second Control Path]

(1) to (3) The same operation as that in the second control path according to Embodiment 1 is performed.

(4) When the feed speed reaches 200.0 in the N02 block of the control path, the processing determines that the condition for starting inter-path waiting has been met. Thus, inter-path waiting is started.

<Embodiment 7>

Figures 10, 11:
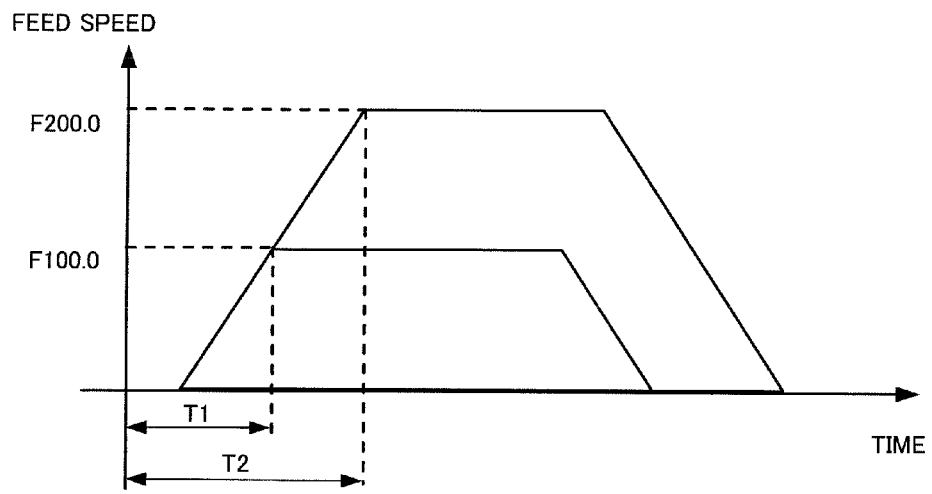
FIG. 10 is a diagram illustrating that an acceleration/deceleration time constant or an acceleration is set for control axes X and Z in each of the first control path and the second control path and that an amount of time (T1 and T2 in FIG. 10) is needed until a specified feed speed is reached.
FIG. 11 is a diagram illustrating a numerical controller with two control paths in which a first control path operates a machining program O0013 and a second control path operates a machining program O0014.

Embodiment 7 will be described with reference to FIG. 11. A numerical controller 50 according to Embodiment 7 (FIG. 1) has two control paths: a control path of a first control path axis control section 57-1 and a control path of a second control path axis control section 57-2. In the numerical controller 50 with the two control paths, the first control path operates a machining program O0013, and the second control path operates a machining program O0014. In an N03 block, "M500" is indicative of an inter-path waiting code, and "P12" is indicative of a "control path targeted for inter-path waiting". This indicates that the first control path and the second control path carry out inter-path waiting. Moreover, according to Embodiment 7, a judgment condition for starting inter-path waiting is that a "specific signal" (an item specified in the machining program) reaches a value specified in the machining program.

"DI100, 5" (first control path) and "DI200, 6" (second control path) in the N03 block are indicative of "specified conditions". The condition for starting inter-path waiting is that specified signals reach respective specified values (a signal No. G100 reaches 5 in an N02 block of the first control path, and a signal No. G200 reaches 6 in an N02 block of the second control path).

In this example, the input signals Nos. G100 and G200 are used, but the condition for starting inter-path waiting may be specified by an F address that is an output signal. For example, in an example of a machining program shown in FIG. 11, when DI100, 5 is changed to D0100, 5 and DI200, 6 is changed to D0200, 6, the condition for starting inter-path waiting is met when a signal No. F100 reaches 5 for the specified condition for the first control path and when a signal No. F200 reaches 6 for the specified condition for the second control path.

In the description of this example, when a coordinate value of the X axis reaches 50.0 in N02 of the first control path, another process by the PMC or the like sets 5 for the signal No. G100 in the first control path. When a coordinate value of the X axis reaches 40.0 in N02 of the second control path, another process by the PMC or the like sets 6 for the signal No. G200 in the second control path.

In this case, the first control path and the second control path operate as follows.

[First Control Path]

(1) to (3) The same operation as that in the first control path according to Embodiment 1 is performed.

(4) When the signal No. G100 reaches 5 in the N 02 block of the first control path, the processing determines that the condition for starting inter-path waiting has been met. Thus, inter-path waiting is started. At this point, inter-path waiting in the second control path has not been started yet. Consequently, a waiting state is continued until the inter-path waiting in the second control path is started.

[Second Control Path]

(1) to (3) The same operation as that in the second control path according to Embodiment 1 is performed.

(4) When the signal No. G200 reaches 6 in the N02 block of the second control path, the processing determines that the condition for starting inter-path waiting has been met. Thus, inter-path waiting is started.

What is claimed is:

1. A numerical controller with an inter-path waiting function, having at least two control paths each sequentially pre-reading and analyzing each block of a machining program recorded in a memory or external storage device, wherein a processor of the numerical controller executes pre-read/analysis processes of a code analysis section that analyzes a loaded block to create code analysis data, a function code determination section that determines a function of the created code analysis data, and an execution data creation section that creates execution data for carrying out the function determined by the function code determination section are carried out in a pre-read/analysis process task;

a pre-read/analysis suspend section suspending the pre-read/analysis process when the function code determination section determines that the block contains an inter-path waiting code;

a specified condition judgment section checking an execution state of a block immediately before the block containing the inter-path waiting code with the pre-read/analysis process suspended by the pre-read/analysis suspend section, to judge whether or not a specified condition is met which specifies a condition for carrying out inter-path waiting commanded in the block containing the inter-path waiting code, the specified condition including at least one of a remaining amount of movement in the preceding block, a torque around any axis, a specific custom macro variable, an elapsed time from a beginning of the preceding block, a mechanical coordinate value of any axis, a feed speed resulting from axis movement in the preceding block, and a specific signal;

an inter-path waiting section allowing suspension of the machining program for a control path targeted for the inter-path waiting commanded in the block containing the inter-path waiting code when the specified condition judgment section judges that the specified condition is met, and an inter-path waiting discard and resumption section determining the inter-path waiting to have been established when the inter-path waiting is carried out by the control path targeted for the inter-path waiting, using the same inter-path waiting code, discarding code analysis data created before the pre-read/analysis process is suspended, and immediately pre-reading the machining program from a block succeeding the block containing the inter-path waiting code to start a pre-read/analysis process, wherein processes of the a pre-read/analysis suspend section, the specified condition judgment section, the inter-path waiting section, and the inter-path waiting discard and resumption section are carried out in the pre-read/analysis process task.

2. The numerical controller with an inter-path waiting function according to claim 1, wherein the specified condition judgment section starts inter-path waiting when the remaining amount of movement in the preceding block reaches a specified value.

3. The numerical controller with an inter-path waiting function according to claim 1, wherein the specified condition judgment section starts inter-path waiting when the torque around any axis reaches a specified value as a result of axis movement in the preceding block.

4. The numerical controller with an inter-path waiting function according to claim 1, wherein the specified condition judgment section starts inter-path waiting when the specific custom macro variable reaches a specified value.

5. The numerical controller with an inter-path waiting function according to claim 1, wherein the specified condition judgment section starts inter-path waiting when the elapsed time from the beginning of the preceding block reaches a specified value.

6. The numerical controller with an inter-path waiting function according to claim 1, wherein the specified condition judgment section starts inter-path waiting when the mechanical coordinate value of any axis reaches a specified value as a result of axis movement in the preceding block.

7. The numerical controller with an inter-path waiting function according to claim 1, wherein the specified condition judgment section starts inter-path waiting when the feed speed reaches a specified value as a result of axis movement in the preceding block.

8. The numerical controller with an inter-path waiting function according to claim 1, wherein the specified condition judgment section starts inter-path waiting when the specific signal is input.

* * * * *